United States Patent Office.

P. G. KENNY, OF RAHWAY, NEW JERSEY.

Letters Patent No. 66,356, dated July 2, 1867.

---

IMPROVED WASH OR STEEP FOR ROOTS, SEEDS, &c.

---

*The Schedule referred to in these Letters Patent and making part of the same.*

---

TO ALL WHOM IT MAY CONCERN:

Be it known that I, P. G. KENNY, of Rahway, in the county of Union, and State of New Jersey, have invented or discovered a new and useful Wash or Steep for Seeds, Roots, Trees, or Plants, of which the following is a full, clear, and exact description.

The object or objects of this invention are, firstly, as used for trees, by applying the wash to the trunks or branches or around the collar of the tree, that is, about the trunk where it projects above the ground, to destroy insects or their eggs, including the borer and other insects which usually attack the trunks of trees or plants, and has also the effect of preventing trees from being afterwards so injured, and thus freed from insects, inducing a more rapid and healthy growth of the tree. The trunk of the tree or plant may, if desired, be so washed before planting.

The basis of the wash here referred to is a solution of the sulphate of iron, the proportions and dissolving of which will be hereinafter more particularly described. Though applicable with advantage, as described, to trees, plants, or vines, said wash may also be used as a steep for corn or other grain or seed; the effect of which is to produce a more rapid germination, and to afford protection against the ravages of worms and birds, which refuse to attack or devour seed or grain so steeped.

A proper proportion for this wash, under each of these applications of it, is from one-third ($\frac{1}{3}$) to one-half ($\frac{1}{2}$) of a pound of the sulphate of iron dissolved in one (1) gallon of water, or preferably in or mixed with chamber lye or urine, which should be stirred from time to time and allowed to remain until it assumes a black color. When the solution is made with chamber lye this wash or steep may be prepared or collected by depositing in a cask or vessel, so as to about half or partially fill the same, urine and sulphate of iron, the latter in about the proportions specified for such cask or vessel when full, and add from day to day the chamber lye as it accumulates till the vessel is filled, stirring in the meanwhile, as described.

What I claim as new and useful, and desire to secure by Letters Patent, is—

1. A wash or steep for seeds, roots, trees, plants, or vines, composed of sulphate of iron dissolved in water, in or about the proportions described, and for use in the manner substantially as specified.

2. Sulphate of iron, dissolved in or admixed with urine or chamber lye to form a wash or steep, essentially as and for the purpose or purposes herein set forth.

P. G. KENNY.

Witnesses:
GEORGE FARRELL,
GEO. W. JONES.